United States Patent [19]
Henke et al.

[11] Patent Number: 5,897,158
[45] Date of Patent: Apr. 27, 1999

[54] MOBILE COMMUNICATION VEHICLE

[76] Inventors: Robert F. Henke, 3413 Rookbrook, Plano, Tex. 75074; Bryan R. Henke, 30 Tompion La., Saratoga, N.Y. 12866

[21] Appl. No.: 08/795,365

[22] Filed: Jan. 4, 1997

Related U.S. Application Data

[63] Continuation of application No. 08/602,098, Feb. 15, 1996, abandoned.

[51] Int. Cl.$^6$ ....................................................... B60P 3/00
[52] U.S. Cl. ........................... 296/181; 296/24.1; 296/21; 296/146.15; 293/128
[58] Field of Search ..................... 296/21, 24.1, 146.16, 296/146.15, 181, 178, 190; 52/204.1, 210, 36.1, 171.1, 171.2; 293/128

[56] References Cited

U.S. PATENT DOCUMENTS

| | | | |
|---|---|---|---|
| 2,407,007 | 9/1946 | Henrichsen | 180/79.2 |
| 3,278,222 | 10/1966 | Mullet et al. | 296/28 |
| 3,852,757 | 12/1974 | Kaiser | 343/713 |
| 4,259,660 | 3/1981 | Oliver | 340/120 |
| 4,449,746 | 5/1984 | Clark | 296/1 R |
| 4,512,433 | 4/1985 | Van Der Lely | 180/235 |
| 4,538,995 | 9/1985 | Fryer | 434/432 |
| 4,583,310 | 4/1986 | Seiler | 41/592 |
| 4,771,305 | 9/1988 | Potoroka | 354/290 |
| 4,897,972 | 2/1990 | Stollery | 52/94 |
| 5,162,139 | 11/1992 | Gomez et al. | 428/31 |
| 5,180,205 | 1/1993 | Shoop | 296/181 |
| 5,373,671 | 12/1994 | Roth et al. | 52/204.1 |
| 5,419,065 | 5/1995 | Lin | 40/550 |
| 5,520,442 | 5/1996 | Kisami et al. | 298/17 R |

*Primary Examiner*—Dennis H. Pedder
*Attorney, Agent, or Firm*—John E. Vandigriff

[57] ABSTRACT

The invention is a broadcast vehicle constructed in the form of a fifth wheel vehicle. The vehicle walls are insulated to provide a sound proof broadcast studio. The vehicle is self contained with a generator power source, an extendable antenna, and a control access from inside and outside of the vehicle. Windows are constructed such that the bottom of the windows in the broadcast studio are off-set inward at the bottom of the window and slanted out to the top of the window such that a side impact to the vehicle will not break the double pane cushion mounted glass.

8 Claims, 7 Drawing Sheets

MOBILE COMMUNICATION VEHICLE

This application is a Continuation of application Ser. No. 08/602,098 filed Feb. 15, 1996, now abandoned.

FIELD OF THE INVENTION

This invention relates to mobile communication vehicles, and more particularly to a mobile communication studio and promotional vehicle in a fifth wheel type vehicle.

BACKGROUND OF THE INVENTION

Promotional and communiation vehicles are generally self propelled, such as trucks, motor coaches and motor recreational vehicles. Utilization of these vehicles results from taking a standard vehicle and modifying it to provide room for promotional or broadcast activites.

U.S. Pat. No. 5,083,826 shows a large tractor cab truck in which the cargo portion has been modified to provide a promotional vehicle.

U.S. Pat. No. 3,152,416 shows a bus vehicle in which signs are immovably attached to the side and rear of the roof.

SUMMARY OF THE INVENTION

The invention relates to a broadcast vehicle constructed in the form of a fifth wheel vehicle. The vehicle walls are insulated to provide a sound proof broadcast studio. The vehicle is self contained with a generator power source, an extendable antenna, and a control access from inside and outside of the vehicle. Windows are constructed such that the bottom of the windows in the boardcast studio are slanted in from top to bottom such that a side impact to the vehicle will not break the double pane cushion mounted glass.

BRIEF DESCRIPTIONS OF THE DRAWINGS

DESCRIPTION OF A PREFERRED EMBODIMENT

Figure 1:
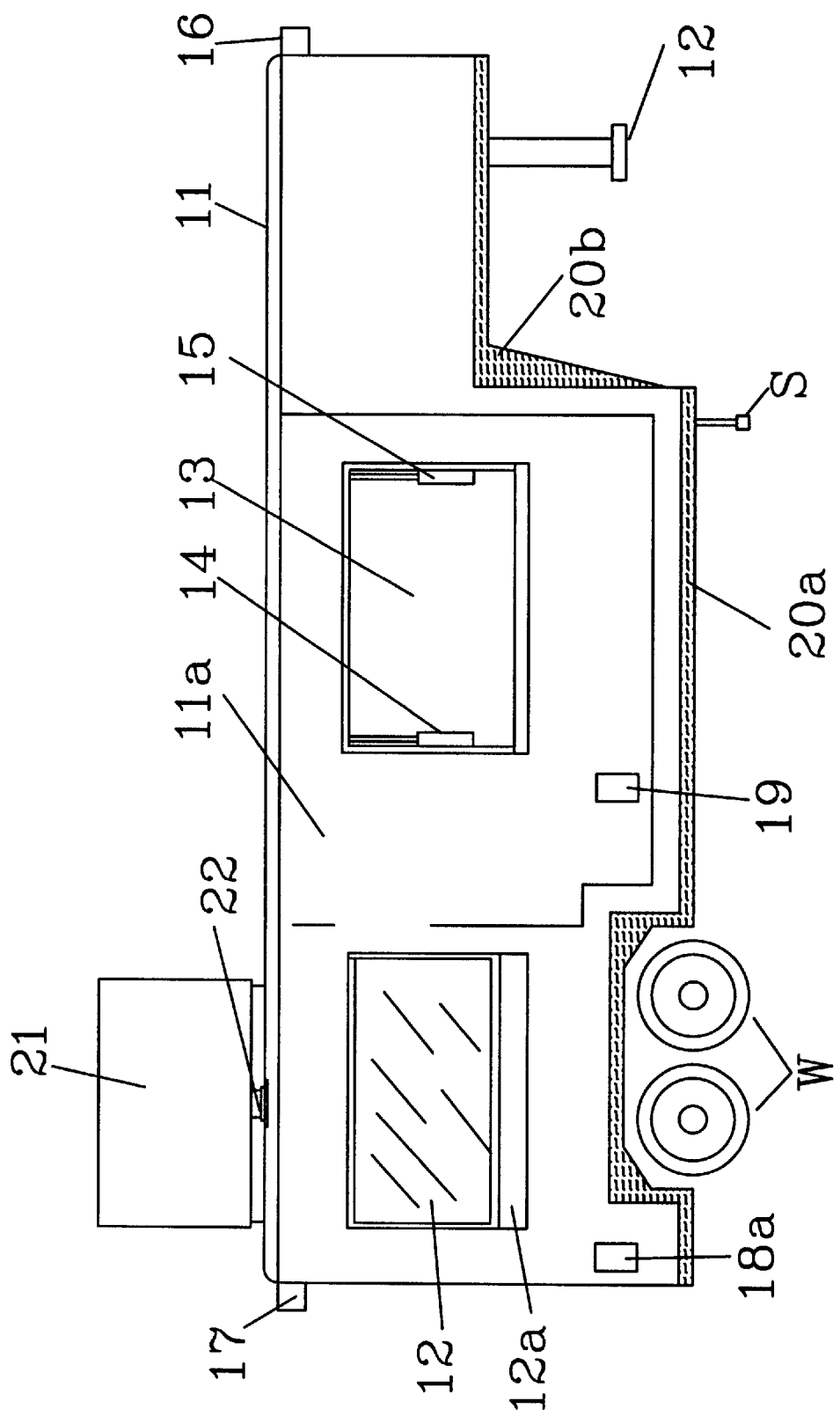
FIG. 1 is a right side view of the vehicle of the present invention.

FIG. 1 is a side view of the right side 11a of a mobile communication vehicle 10 utilizing a fifth wheel trailer. Vehicle 10 has a body 11 mounted on wheels W, there being two wheels W on each side of body 11 positioned to the rear of the body 11. A hitch post 12 is on the front end, hitch post being utilized to connect vehicle 10 to another vehicle (not illustrated) for towing vehicle 10. There is at least one support S on each side of vehicle 10 to support vehicle 10 when it is not connected to a tow vehicle. Supports S may be manual, hydraulic, or pneumatic jacks that can raise or lower to level vehicle 10. Side 11a includes a window 13 which may be opened and held in an opened position with supports 14 and 15. Below window 13 is platform 13a which may be used as a counter top when window is in an open position.

The lower edge of side 11a is trimmed with a reenforcing trim 20a, and trim 20b which extends up and across the front of side 11a. Trim 20a and 20b may be a metal or high impact plastic designed to be decorative and to protect side 11a against impact.

Window 12 is mounted in the back end of side 11a and is positioned over wheels 11. The bottom edge of window 12 is recessed inward above panel 12a which is slanted inward to cause window 12 to slant outward from the bottom to the top of window 12. Window 12 is a double pane window with the two panes separated by an airspace. Window 12 shock mounted in side 11a with a rubber mounting 12b which extends around window 12.

Side 11a includes two access panels. Panel 19 which includes an external antenna mast control. Panel 18a an is access panel for providing control access to equipment inside vehicle 10.

On top of vehicle is mounted two display signs 21 and 24 (FIG. 2) which are mounted on bases 22 and 23 respectively, which permit signs 21 and 24 to be folded down on to the top of vehicle in a storage position, or in a vertical position to allow display of information of each of the signs. Each sign will also, when in a vertical position, rotate about its respective base. The signs may be an electronic display where the displayed information is programmable, or the signs may be for a fixed nature where the displayed information is printed or formed by removable letters.

On each end of vehicle 10 is a flashing light display. These displays, display 16 on the front end of vehicle 10 and display 17 one the back end of vehicle 10, may include, for example, flashing and/or rotating lights.

Figure 2:
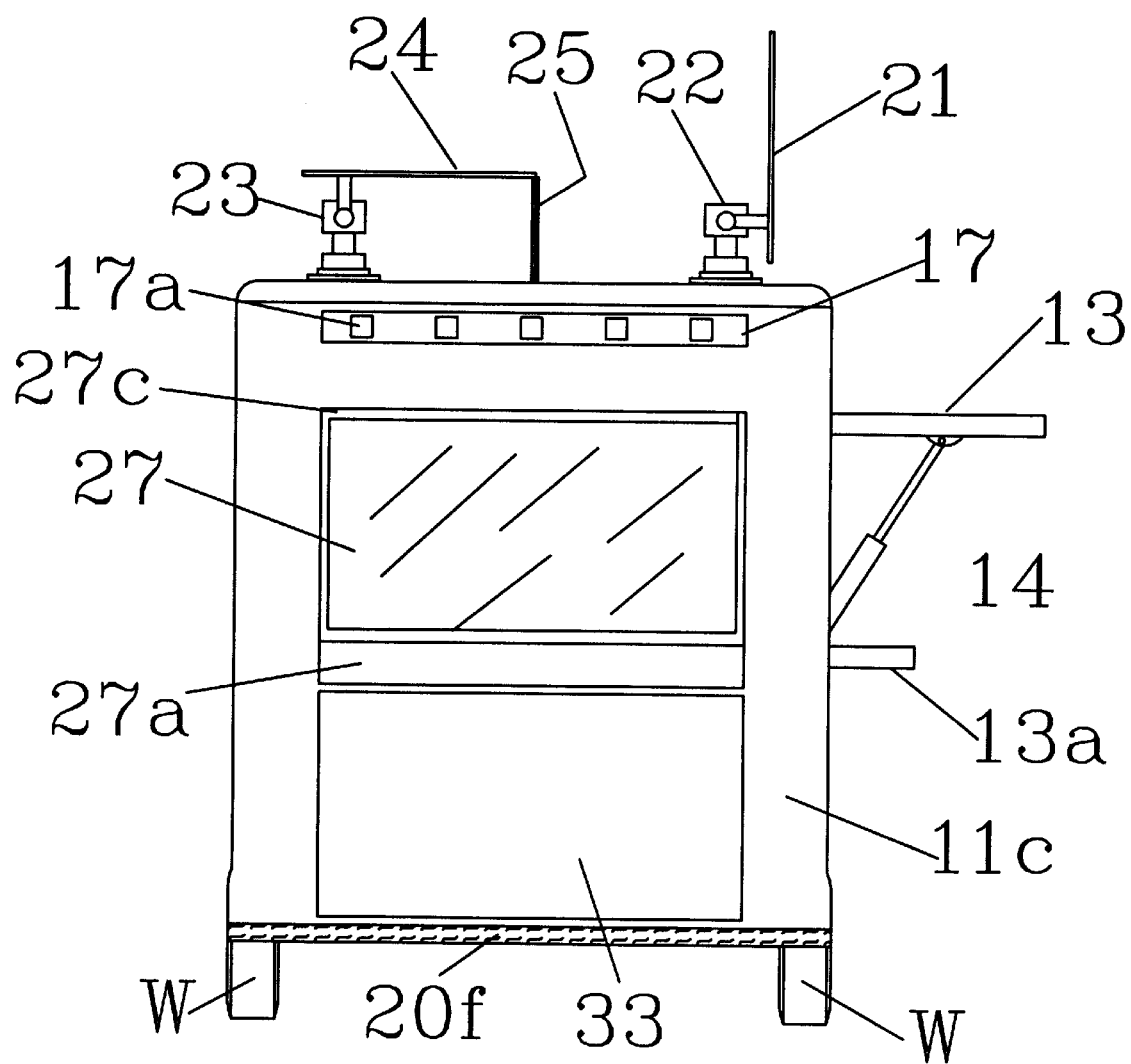
FIG. 2 is an end view of the vehicle.

FIG. 2 is a back end 11c of vehicle 10. Back 11c has a window 27 that is slanted inward at the bottom the same as window 12 on the right side of vehicle 10. Window 27 is mounted in the back end 11c. The bottom edge of window 27 is recessed inward above panel 27a which is slanted inward to cause window 27 to slant outward from the bottom to the top of window 27. Window 27 is a double pane window with the two panes separated by an airspace. Window 27 is shock mounted in side 11c with a rubber mounting 27c which extends around window 27. Below window 27 is an area 33 which may be used as a display or sign mounting area. Side window 13 is shown in an open position, and held open by supports 14 and 15 (only support 14 shown). Platform 13a is shown below window 13. Mounted above window 27 is a light display 17 with a plurality of lights 17a, which may be fixed or rotating colored lights. The bottom of back 11c is trimmed with a metal or plastic stip 20f to provide for collision protection.

Mounted on top of vehicle 10 are shown two display signs. Sign 21 and sign 24. Sign 21 is mounted on a pivoting mounted 22, and sign 24 is mounted on a pivoting mounted 23. A support 25 supports signs 21 and 24 when in a lowered position, as shown for sign 24.

Figure 3:
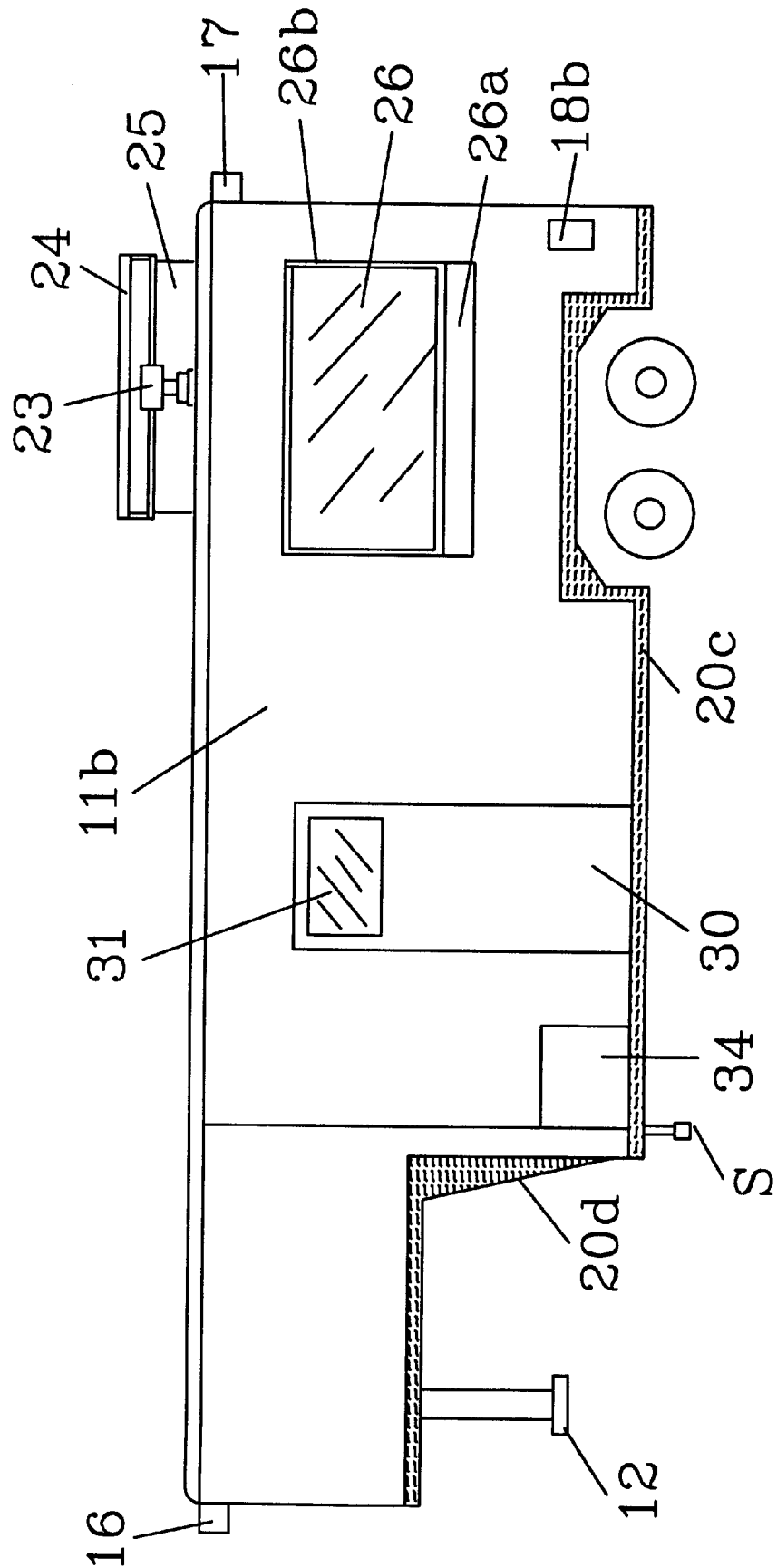
FIG. 3 is a left side view of the vehicle.

FIG. 3 is a left side view 11b of vehicle 10. Leveling support S is shown supporting the front end of vehicle 10. Window 26 is mounted in the back end of side 11b and is positioned over wheels W. The bottom edge of window 26 is recessed inward above panel 26a which is slanted inward to cause window 26 to slant outward from the bottom to the top of window 26. Window 26 is a double pane window with the two panes separated by an airspace. Window 26 is shock mounted in side 11b with a rubber mounting 26b which extends around window 26.

Door 30, with window 31 provides access to the interior of vehicle 10. The lower edge of side 11b is trimmed with a reenforcing trim 20c, and trim 20d which extends up and across the front of side 11b. Trim 20c and 20d may be a metal or high impact plastic designed to be decorative and to protect side 11b against impact. Door 34 provides access to a generator which supplies power to the vehicle. Panel 18b is an access panel for providing control access to equipment inside vehicle 10. Sign 24, mounted on pivotal mount 23 is shown in a horizonal position with the top end on support 25.

Figure 4:
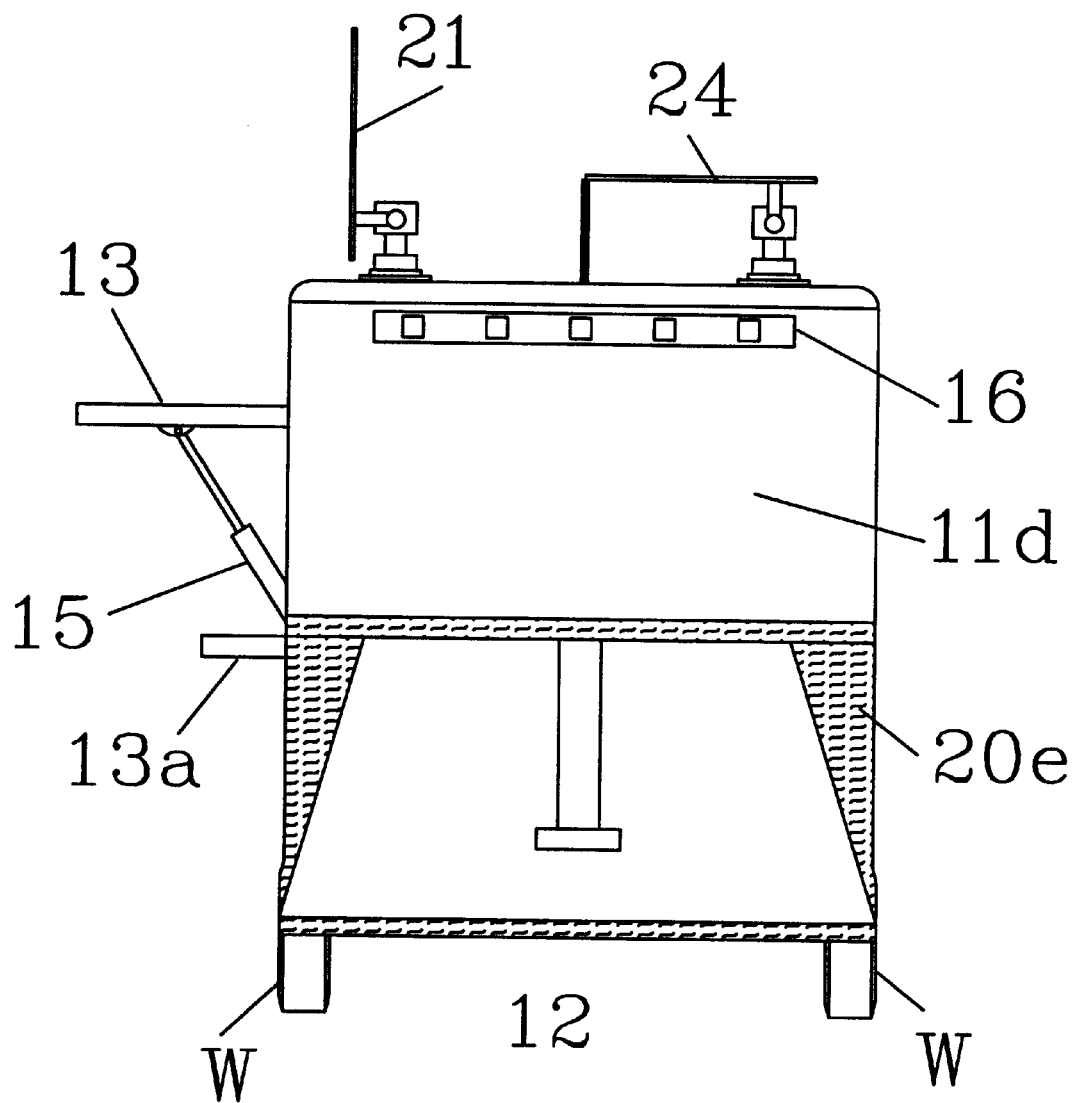
FIG. 4 is a front view of the vehicle

FIG. 4 is an end view of the front lid of vehicle 10. End 11d is trimmed with with a reenforcing trim 20e. Trim 20e may be a metal or high impact plastic designed to be decorative and to protect side 11a against impact. Light 16 is mounted at the top of end 11d. Side window 13 is shown in a raised position and held open by support 15. Sign 24 is shown in a lowered position and sign 21 is shown in a raised position.

Figure 6:
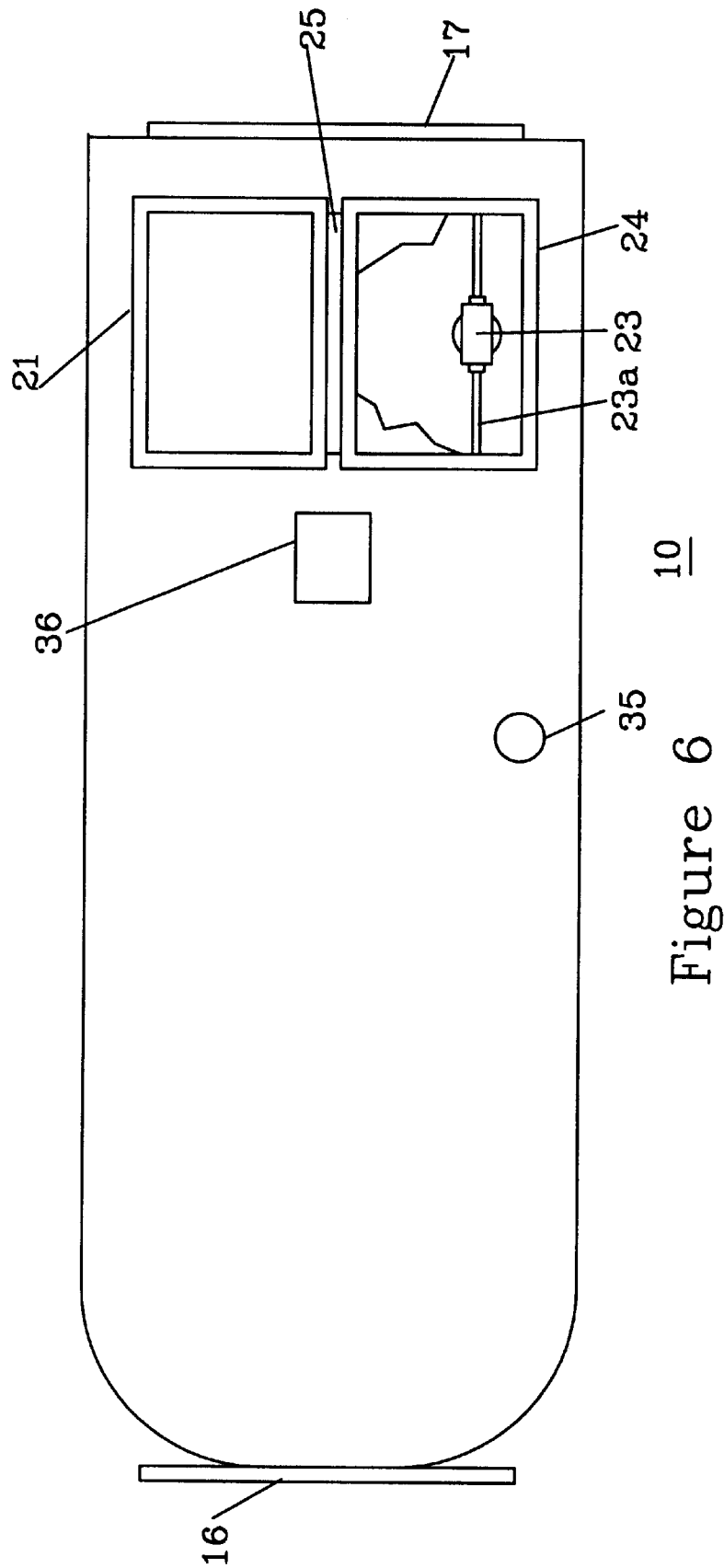
FIG. 6 is a cross-sectional view showing the interior of the vehicle.

FIG. 6 is a top view of vehicle 10. Display signs 21 and 24 are shown in the storage position. Sign 24 is cut-away to show pivot mount 23 and support bar 23a, on which sign 24 rotates to an upright position. Hatch 36 is an emergency escape hatch from the inside of vehicle 10.

Antenna 35 is a telescoping antenna which may be raised during use and lowered when vehicle is being moved from one place to another.

Figure 5:
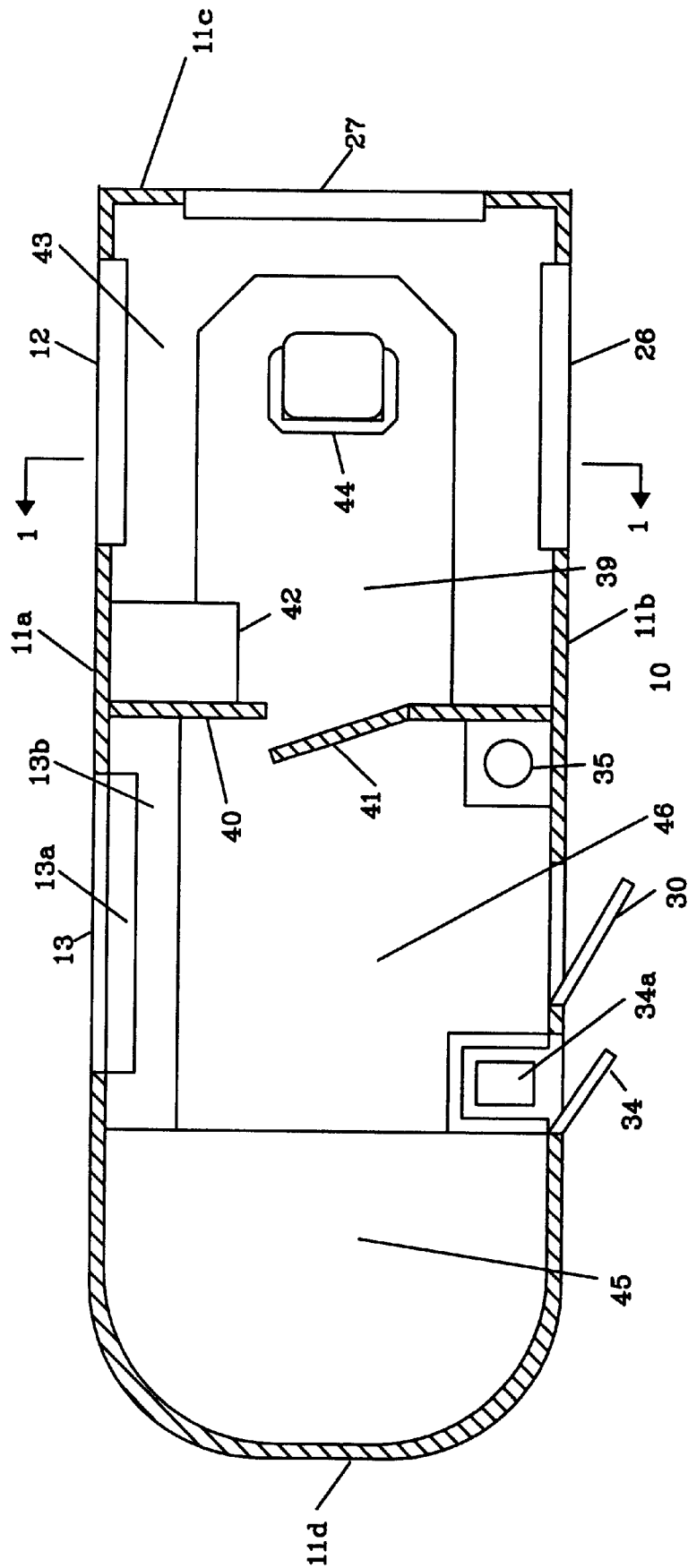
FIG. 5 is a top view of the vehicle.

FIG. 5 is a cross-sectional view showing the interior of vehicle 10. Each of the walls 11a, 11b, 11c and 11d, are insulated with an insulating material to provide a sound proof interior, especially the room 39 which is the broadcast room. Room 39 is enclosed by wall 40 and door 41 which are also insulated. In room 39 is a rack 42 which holds the electronic broadcast equipment. Desk 43 extends around three sides of room 39 to provide a work surface, and at least one chair 44 is used to provide seating for the broadcast person.

Room 46 provides an outer room for additional seating area, and includes a desk 13b, a portion of which, 13a, may be extend out of vehicle 11 through window 13. Generator 34a is shown behind access door 34. Area 45 is a storage area.

Figure 7:
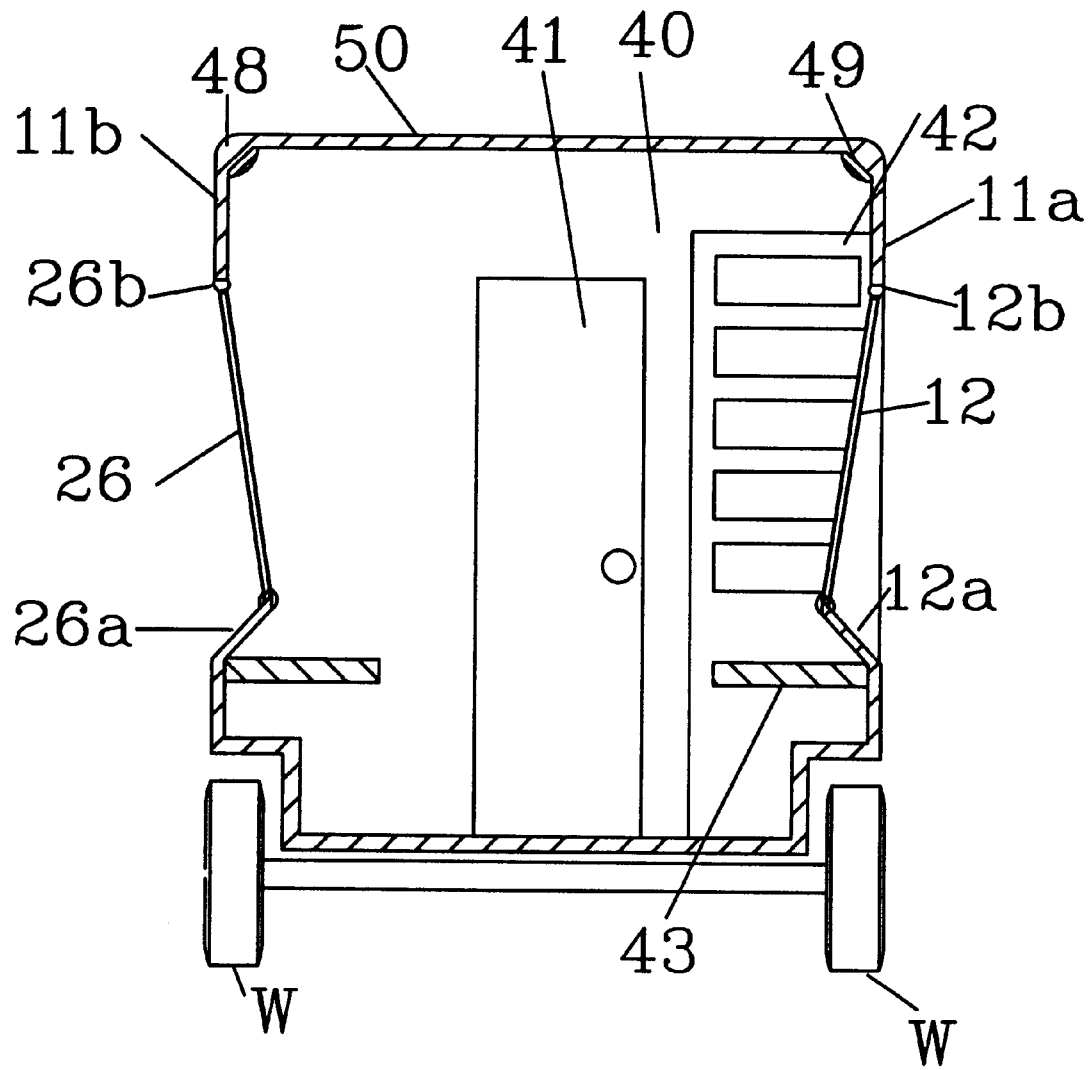
FIG. 7 is a cross-sectional view taken through section 1—1 of FIG. 6.

FIG. 7 is a cross-sectional view of vehicle 10 taken through section 1—1. Windows 12 and 26 as shown mounted in rubber shock mount gaskets 12b and 26b, respectively. The lower edges of each of windows 12 and 26 are slanted inward and supported by inwardly slanted panels 12a and 26a, respectively. Walls 11a, 11b and the top 50 are insulated to provide a sound proof broadcast room 39. There are two lights, lights 48 and 49, recessed in to the upper corners of walls 11a and 11b. Lights 48 and 49 provide the interior lighting for broadcast room 39. Similar lights (not illustrated) illuminate room 46. Door 41 is shown in wall 40. Equipment rack mount 42 is shown against wall 40, and a cross-section of desk 43 is shown on each side of room 39.

What is claimed:

1. A communication vehicle, comprising:
   a vehicle body constructed in the form of a fifth-wheel trailer having right, left, back and front sides, and back and front ends, and a pair of wheels on each right and left side;
   a communication room in said body, having sound insulated walls to sound proof the communication room, said communication room located in the back end of the vehicle body;
   a plurality of double pane windows in the insulated walls of the communication room, there being windows on three sides of the communication room, said windows angled outward from bottom to top, the windows in the right and left sides of the vehicle positioned over a pair of wheel, and said bottom sides of the windows are displaced inward from the side of the vehicle in which they are mounted to provide protection from side impact to the vehicle; and
   reenforcing material around the sides and back of the vehicle body and under said windows to provide impact protection to the body and inset windows.

2. The communication vehicle according to claim 1, wherein said vehicle has a second room, located in a mid section of the vehicle adjacent to the communication room, which has a first door providing access from outside the vehicle to the second room, and a second internal door providing access from the second room to the communication room.

3. The communication vehicle according to claim 1, including a pair of display signs that rotate from a stored horizontal position to a vertical position for display, and rotate in a vertical position to position in a desired direction.

4. The communication vehicle according to claim 1, wherein said windows are shock mounted in the sides in which they are mounted.

5. A communication vehicle, comprising:
   a vehicle body constructed in the form of a fifth-wheel trailer having right, left, back and front sides, and back and front ends, and a pair of wheels on each right and left side;
   a communication room in said body having insulated walls to sound proof the communication room;
   a plurality of double pane windows in the insulated walls of the communication room, there being windows on three sides of the communication room, said windows angled outward from bottom to top, the windows in the right and left sides of the vehicle positioned over a pair of wheel, and said bottom sides of the windows are displaced inward from the side of the vehicle in which they are mounted to provide protection from side impact to the vehicle;
   a reenforcing material around the sides and back of the vehicle body and under said windows to provide impact protection to the body and inset windows; and
   a pair of fold down, rotatable display signs on top of the vehicle.

6. The communication vehicle according to claim 5, wherein said vehicle has a second room, located in a mid section of the vehicle adjacent to the communication room, which has a first door providing access from outside the vehicle to the second room, and a second internal door providing access from the second room to the communication room.

7. The communication vehicle according to claim 5, wherein the pair of display signs rotate from a stored horizontal position to a vertical position for display, and rotate in a vertical position to position in a desired direction.

8. The communication vehicle according to claim 5, wherein said windows are shock mounted in the sides in which they are mounted.

* * * * *